United States Patent
Nadimpalli et al.

(10) Patent No.: US 7,535,204 B1
(45) Date of Patent: May 19, 2009

(54) SPLIT-PHASE SWITCHING POWER CONVERTER

(75) Inventors: Praveen V. Nadimpalli, Chandler, AZ (US); Thomas A. Somerville, Tempe, AZ (US)

(73) Assignee: RF Micro Devices, Inc., Greensboro, NC (US)

( * ) Notice: Subject to any disclaimer, the term of this patent is extended or adjusted under 35 U.S.C. 154(b) by 89 days.

(21) Appl. No.: 11/684,342

(22) Filed: Mar. 9, 2007

(51) Int. Cl.
*G05F 1/10* (2006.01)
*G05F 1/652* (2006.01)

(52) U.S. Cl. .................. 323/222; 323/282; 323/284; 323/283

(58) Field of Classification Search .................. 323/222, 323/282, 284, 283
See application file for complete search history.

(56) References Cited

U.S. PATENT DOCUMENTS

| | | | |
|---|---|---|---|
| 6,433,527 B1 * | 8/2002 | Izadinia et al. .............. 323/300 |
| 6,462,525 B1 * | 10/2002 | Chen .......................... 323/285 |
| 6,534,960 B1 * | 3/2003 | Wells et al. .................. 323/222 |
| 6,628,106 B1 * | 9/2003 | Batarseh et al. ............. 323/222 |
| 6,683,441 B2 * | 1/2004 | Schiff et al. ................. 323/222 |
| 6,703,812 B1 * | 3/2004 | Lethellier .................... 323/222 |
| 6,791,304 B2 * | 9/2004 | Pearce et al. ................ 323/283 |
| 7,265,522 B2 * | 9/2007 | Sutardja et al. ............. 323/222 |

* cited by examiner

*Primary Examiner*—Bao Q Vu
(74) *Attorney, Agent, or Firm*—Withrow & Terranova, P.L.L.C.

(57) ABSTRACT

The present invention is a switching power converter that includes multiple energy transfer legs feeding a common energy storage circuit. Each energy transfer leg has a unique switching signal with a common switching frequency. The unique switching signals are phase-shifted from each other to minimize generation of switching noise within the passband of a received RF signal. Each unique switching signal has an active state during which energy may be transferred to the energy transfer leg, and an inactive state during which energy may be transferred from the energy transfer leg to the common energy storage circuit.

22 Claims, 9 Drawing Sheets

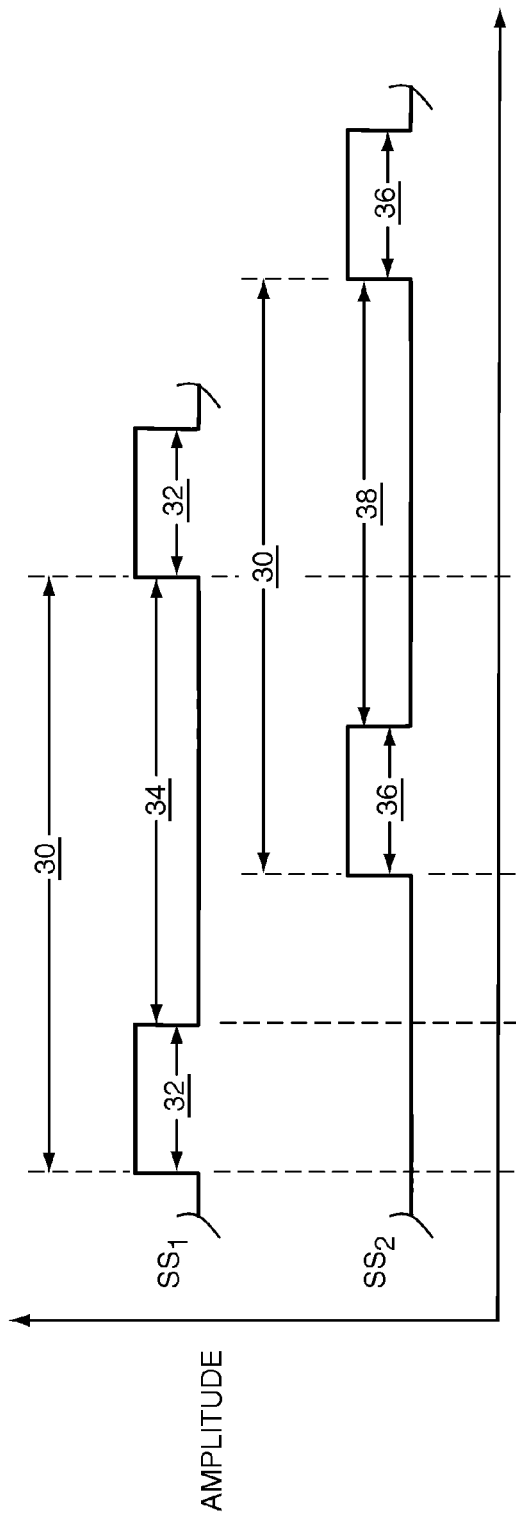
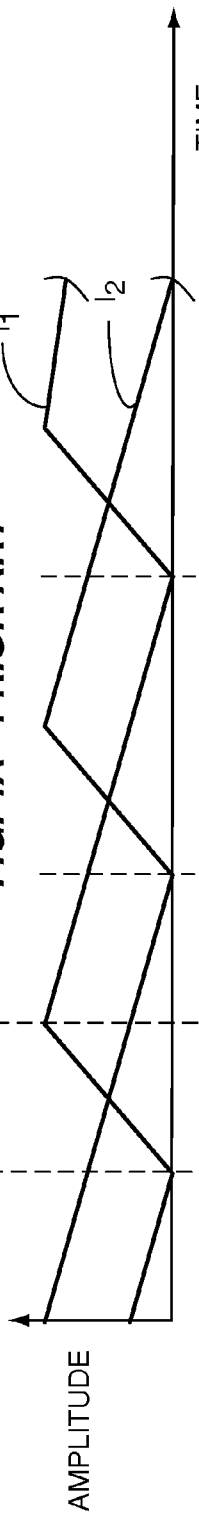
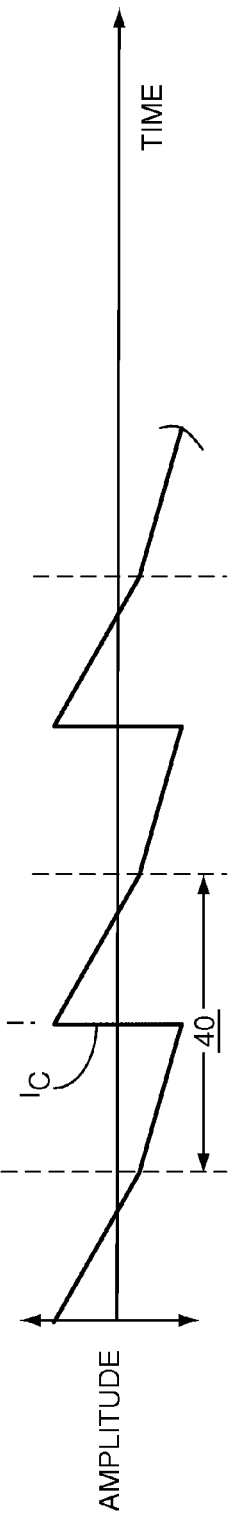
FIG. 4A - PRIOR ART
FIG. 4B - PRIOR ART
FIG. 4C - PRIOR ART

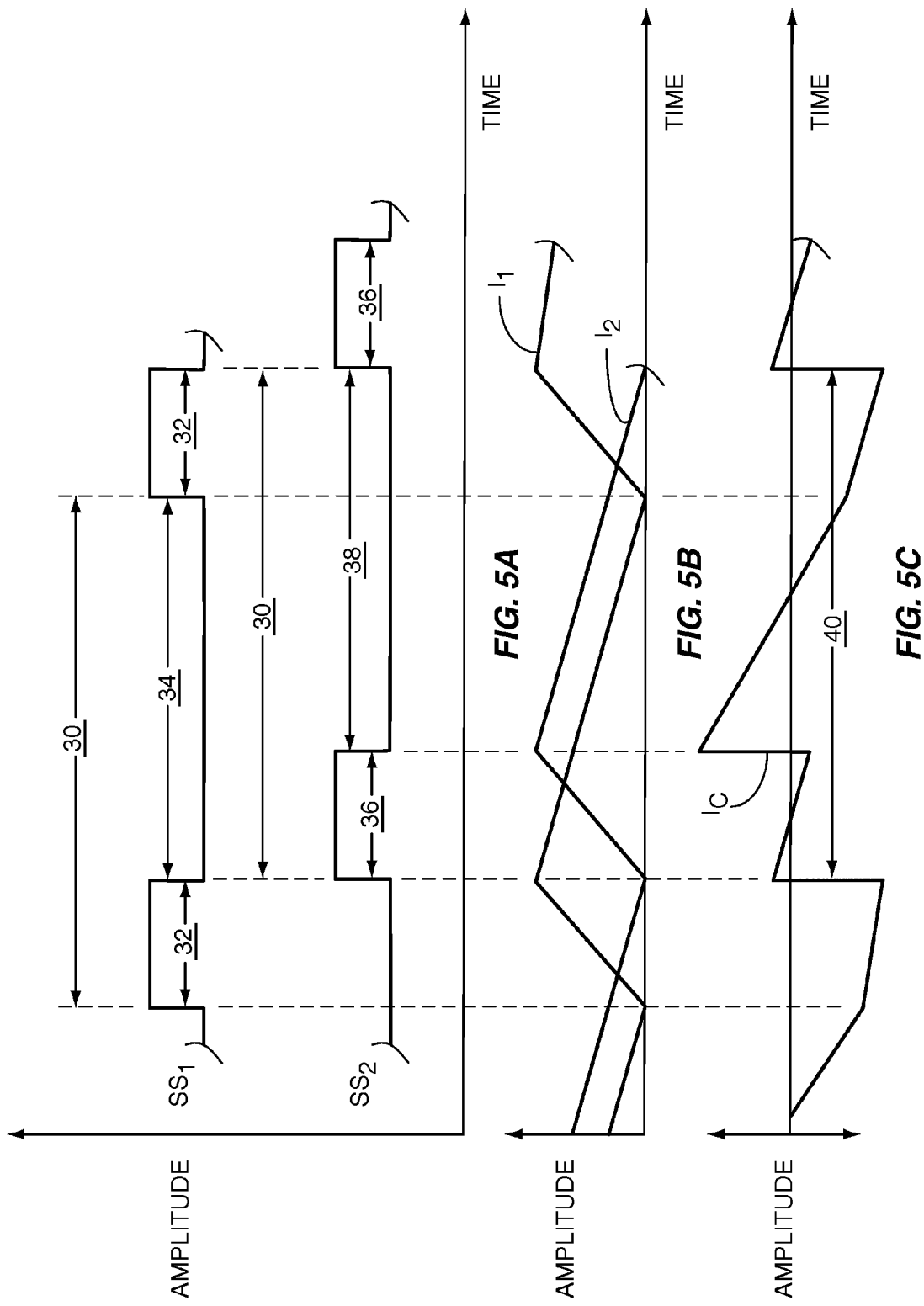

SPLIT-PHASE SWITCHING POWER CONVERTER

FIELD OF THE INVENTION

The present invention relates to switching power converters used in radio frequency (RF) communications systems.

BACKGROUND OF THE INVENTION

A switching power converter is often used when an RF communications system needing a regulated power supply is powered from an unregulated DC source of power, such as a battery, or a regulated DC source of power at a different voltage. The switching power converter is driven from at least one switching signal having a switching frequency. Circuitry within the switching power converter tends to transition synchronously with the switching signal, which may generate voltage spikes, current spikes, or both. The voltage and current spikes may generate interfering noise signals at the fundamental frequency and harmonics of the switching signal. If a frequency of an interfering noise signal falls within the passband of a received RF signal, receiver sensitivity can be degraded, which is known as receiver de-sensitization. The switching signal may have an active state and an inactive state.

The basic operation of a single-phase switching power converter includes receiving a DC input signal into an energy transfer circuit that may transfer energy from the DC input signal into at least one energy transfer element during the active state, and may include transferring energy from the energy transfer element to an energy storage circuit during the inactive state. The single-phase switching power converter provides a regulated DC output signal by transferring energy from the energy storage circuit to the DC output signal during the active state, and by transferring energy from the energy transfer element to the DC output signal during the inactive state. The switching behavior causes ripple currents and voltages at the fundamental frequency and harmonics of the switching signal. Architectures that may reduce ripple currents and voltages include switching power converters with at least two phases.

The basic architecture of a two-phase switching power converter may include two energy transfer circuits instead of one energy transfer circuit. Each energy transfer circuit may have its own switching signal. The two switching signals may share a common frequency, and may be phase-shifted 180 degrees from each other. The two-phase switching power converter may reduce the magnitude of ripple voltages, ripple currents, voltage spikes, current spikes, or any combination thereof; however, the fundamental frequency of the ripple and spikes may be twice the frequency of the switching signal instead of one times the frequency of the switching signal. A higher fundamental frequency of ripple and spikes may increase the magnitude of resulting noise signals that fall within the passband of a received RF signal. Thus, there is a need for a multiple-phase switching power converter having reduced switching noise signals that fall within the passband of a received RF signal.

SUMMARY OF THE INVENTION

The present invention is a switching power converter that includes multiple energy transfer legs feeding a common energy storage circuit. Each energy transfer leg has a unique switching signal with a common switching frequency. The unique switching signals are phase-shifted from each other to minimize generation of switching noise within the passband of a received RF signal. Each unique switching signal has an active state during which energy may be transferred to the energy transfer leg, and an inactive state during which energy may be transferred from the energy transfer leg to the common energy storage circuit.

In one embodiment of the present invention, the active state of one unique switching signal is contiguous to the active state of another unique switching signal in order to minimize switching noise that falls within the passband of a received RF signal by lowering the fundamental frequency of the switching noise. Each unique switching signal may have a common switching duty-cycle, which is used to regulate the output of the switching power converter. Each energy transfer leg may include at least one energy transfer element, such as an inductive element. The common energy storage circuit may include at least one energy storage element, such as a capacitive element. The present invention may be included in a switching power converter that provides a DC regulated output voltage that is greater than the DC input voltage. Such a switching power converter is known as a boost converter. The present invention may be included in a switching power converter that provides a DC regulated output voltage that is less than the DC input voltage. Such a switching power converter is known as a buck converter. The present invention may be included in a combined boost and buck converter in which the DC input voltage may be less than, equal to, or greater than the DC regulated output voltage.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 4A, 4B and 4C are graphs showing timing diagrams of a traditional two-phase switching power converter.

FIGS. 5A, 5B and 5C are graphs showing timing diagrams of the split-phase switching power converter illustrated in FIG. 3.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a switching power converter that includes multiple energy transfer legs feeding a common energy storage circuit. Each energy transfer leg has a unique switching signal with a common switching frequency. The unique switching signals are phase-shifted from each other to minimize generation of switching noise within the passband of a received RF signal. Each unique switching signal has an active state during which energy may be transferred to the energy transfer leg, and an inactive state during which energy may be transferred from the energy transfer leg to the common energy storage circuit.

In one embodiment of the present invention, the active state of one unique switching signal is contiguous to the active state of another unique switching signal in order to minimize switching noise that falls within the passband of a received RF signal by lowering the fundamental frequency of the switching noise. Each unique switching signal may have a common switching duty-cycle, which is used to regulate the output of the switching power converter. Each energy transfer leg may include at least one energy transfer element, such as an inductive element. The common energy storage circuit may include at least one energy storage element, such as a capacitive element. The present invention may be included in a switching power converter that provides a DC regulated output voltage that is greater than the DC input voltage. Such a switching power converter is known as a boost converter. The present invention may be included in a switching power converter that provides a DC regulated output voltage that is less than the DC input voltage. Such a switching power converter is known as a buck converter. The present invention may be included in a combined boost and buck converter in which the DC input voltage may be less than, equal to, or greater than the DC regulated output voltage.

Figure 1:
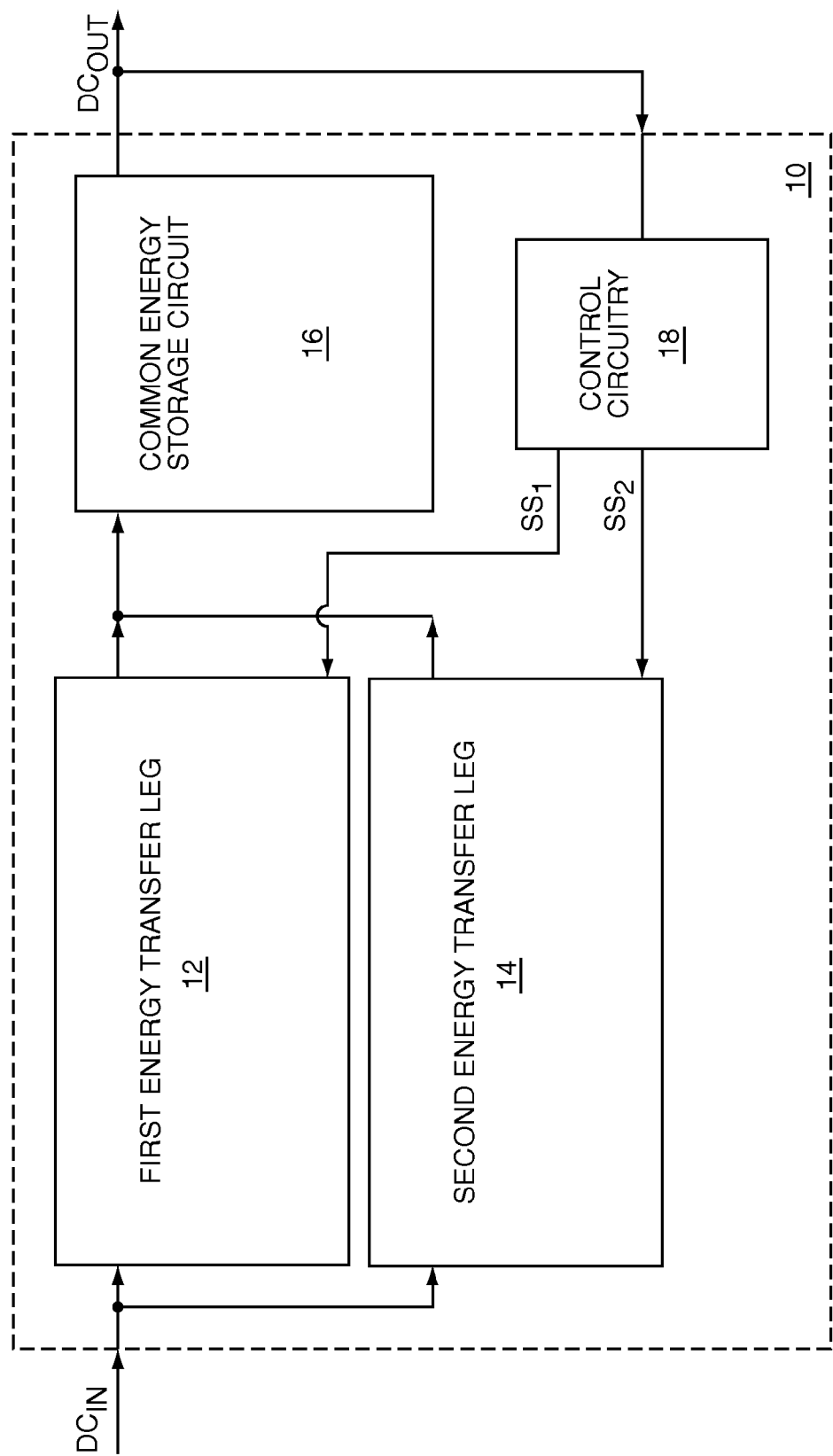
FIG. 1 shows one embodiment of the present invention, which is a split-phase switching power converter having two energy transfer legs.

FIG. 1 shows one embodiment of the present invention, which is a split-phase switching power converter 10 having two energy transfer legs. A first energy transfer leg 12 and a second energy transfer leg 14 receive a DC input signal $DC_{IN}$. Both energy transfer legs 12, 14 feed a common energy storage circuit 16, which provides a DC output signal $DC_{OUT}$. Control circuitry 18 receives the DC output signal $DC_{OUT}$, and provides a first switching signal $SS_1$ to the first energy transfer leg 12 and a second switching signal $SS_2$ to the second energy transfer leg 14. The control circuitry 18 regulates the DC output signal $DC_{OUT}$ by varying the switching signals $SS_1$, $SS_2$.

Figure 2:
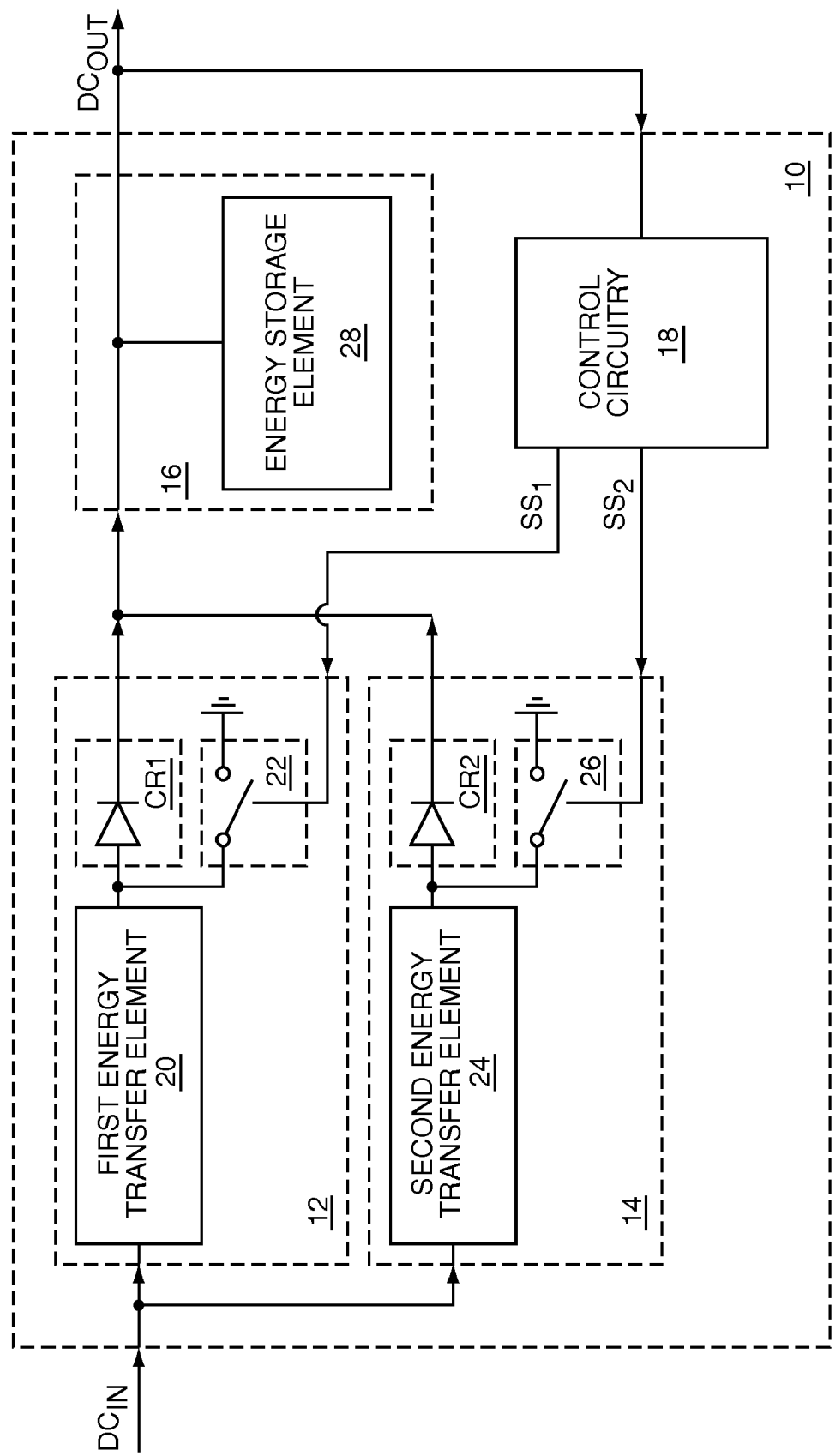
FIG. 2 shows details of the split-phase switching power converter illustrated in FIG. 1.

FIG. 2 shows details of the split-phase switching power converter 10 illustrated in FIG. 1. The first energy transfer leg 12 includes a first energy transfer element 20, which receives the DC input signal $DC_{IN}$ and feeds both the anode of a first diode element CR1 and a first switching element 22. The cathode of the first diode element CR1 feeds the common energy storage circuit 16 and is coupled to the second energy transfer leg 14. A control input to the first switching element 22 receives the first switching signal $SS_1$. When the first switching signal $SS_1$ is in a first active state, the first switching element 22 is closed, thereby coupling the output of the first energy transfer element 20 and the anode of the first diode element CR1 to ground. During the first active state, energy may be transferred from the DC input signal $DC_{IN}$ into the first energy transfer element 20. Additionally, the first diode element CR1 isolates the first energy transfer leg 12 from the second energy transfer leg 14 and the common energy storage circuit 16. When the first switching signal $SS_1$ is in a first inactive state, the first switching element 22 is open, thereby allowing the voltage at the anode of the first diode element CR1 to rise above the voltage at the cathode of the first diode element CR1, which may forward bias the first diode element CR1. During the first inactive state, energy may be transferred from the DC input signal $DC_{IN}$ and the first energy transfer element 20 into the common energy storage circuit 16.

The second energy transfer leg 14 includes a second energy transfer element 24, which receives the DC input signal $DC_{IN}$ and feeds both the anode of a second diode element CR2 and a second switching element 26. The cathode of the second diode element CR2 feeds the common energy storage circuit 16 and is coupled to the first energy transfer leg 12. A control input to the second switching element 26 receives the second switching signal $SS_2$. When the second switching signal $SS_2$ is in a second active state, the second switching element 26 is closed, thereby coupling the output of the second energy transfer element 24 and the anode of the second diode element CR2 to ground. During the second active state, energy may be transferred from the DC input signal $DC_{IN}$ into the second energy transfer element 24. Additionally, the second diode element CR2 isolates the second energy transfer leg 14 from the first energy transfer leg 12 and the common energy storage circuit 16. When the second switching signal $SS_2$ is in a second inactive state, the second switching element 26 is open, thereby allowing the voltage at the anode of the second diode element CR2 to rise above the voltage at the cathode of the second diode element CR2, which may forward bias the second diode element CR2. During the second inactive state, energy may be transferred from the DC input signal $DC_{IN}$ and the second energy transfer element 24 into the common energy storage circuit 16.

The cathodes of the diode elements CR1, CR2 are coupled to an energy storage element 28 in the common energy storage circuit 16 to provide the DC output signal $DC_{OUT}$. The energy storage element 28 filters the transfer of energy from the energy transfer legs 12, 14 to provide a stable DC output signal $DC_{OUT}$. A first duty-cycle is equal to a duration of the first active state divided by the sum of the durations of the first active state and the first inactive state. A second duty-cycle is equal to a duration of the second active state divided by the sum of the durations of the second active state and the second inactive state. Increasing the first duty-cycle increases the duration of the first active state, thereby increasing the amount of energy transferred from the DC input signal $DC_{IN}$ into the first energy transfer element 20, which increases the amount of energy transferred from the DC input signal $DC_{IN}$ and the first energy transfer element 20 into the common energy storage circuit 16 during the first inactive state. If the load being driven by the split-phase switching power converter 10 remains constant, this increase in the amount of energy transferred increases the magnitude of the DC output signal $DC_{OUT}$. The second duty-cycle has a similar effect on the magnitude of the DC output signal $DC_{OUT}$. Therefore, the DC output signal $DC_{OUT}$ can be controlled by changing the first duty-cycle, the second duty-cycle, or both. The control circuitry regulates the DC output signal $DC_{OUT}$ to be equal to an output setpoint by controlling the first and second duty-cycles. Normally, the first duty-cycle is approximately equal to the second duty-cycle; however, in some embodiments the duty-cycles may be unequal.

Figure 3:
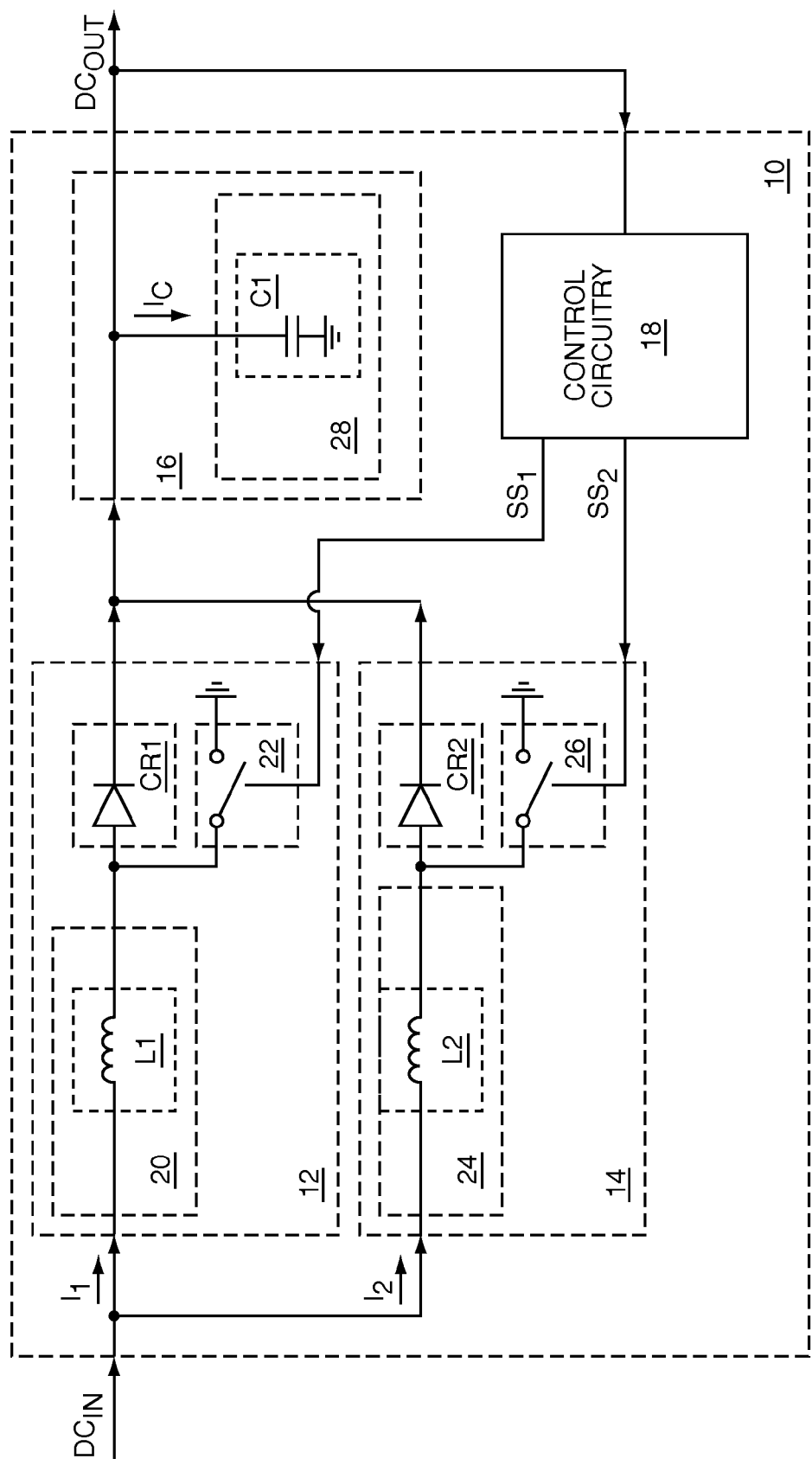
FIG. 3 shows details of the energy transfer and storage elements illustrated in FIG. 2.

FIG. 3 shows details of the energy transfer elements 20, 24 and energy storage element 28 illustrated in FIG. 2. The first energy transfer element 20 may include a first inductive element L1 having a first inductive current $I_1$. The second energy transfer element 24 may include a second inductive element L2 having a second inductive current $I_2$. The energy storage element 28 may include a capacitive element C1 having a capacitive current $I_C$.

FIGS. 4A, 4B and 4C are graphs showing example timing diagrams of an traditional two-phase switching power converter, which is one illustration of prior art. The traditional two-phase switching power converter may use similar energy transfer legs 12, 14 and common energy storage circuit 16 to those used in the split-phase switching power converter 10 illustrated in FIG. 3; however, the phase-shift between the switching signals $SS_1$, $SS_2$ in the traditional two-phase switching power converter is different from the phase-shift in the split-phase switching power converter 10. The traditional two-phase switching power converter uses a nominal phase-shift between the energy transfer legs, which is approximately 180 degrees. FIG. 4A shows the first switching signal $SS_1$ and the second switching signal $SS_2$, which is phase-shifted from the first switching signal $SS_1$ by approximately 180 degrees. Both switching signals $SS_1$, $SS_2$ share a common switching frequency, which translates into a common switching period 30. The first switching signal $SS_1$ has a first active state 32 and a first inactive state 34. The second switching signal $SS_2$ has a second active state 36 and a second inactive state 38. Both switching signals $SS_1$, $SS_2$ have a duty-cycle of approximately 25%. During the first active state 32, the first switching element 22 is closed, which applies the magnitude of the DC input signal $DC_{IN}$ across the first inductive element L1, thereby causing the first inductive current $I_1$ to increase. During the first inactive state 34, the first switching element 22 is open, which causes the first inductive current $I_1$ that was developed during the first active state 32 to be fed into the common energy storage circuit 16. In this example, the magnitude of the DC output signal $DC_{OUT}$ is greater than the magnitude of the DC input signal $DC_{IN}$; therefore, during the first inactive state 34, the voltage across the first inductive element L1 is reversed from the voltage during the first active state 32, resulting in a decrease of the first inductive current $I_1$.

Likewise, during the second active state 36, the second switching element 26 is closed, which applies the magnitude of the DC input signal $DC_{IN}$ across the second inductive element L2, thereby causing the second inductive current $I_2$ to increase. During the second inactive state 38, the second switching element 26 is open, which causes the second inductive current $I_2$ that was developed during the second active state 36 to be fed into the common energy storage circuit 16. Since the magnitude of the DC output signal $DC_{OUT}$ is greater than the magnitude of the DC input signal $DC_{IN}$, during the second inactive state 38, the voltage across the second inductive element L2 is reversed from the voltage during the second active state 36, resulting in a decrease of the second inductive current $I_2$.

FIG. 4B illustrates the first and second inductive currents $I_1$, $I_2$ relative to the first and second switching signals $SS_1$, $SS_2$. FIG. 4C illustrates the capacitive current $I_C$, which is known as a ripple current. The capacitive current $I_C$ is equal to the sum of the currents from the energy transfer legs 12, 14 minus the current supplied as part of the DC output signal $DC_{OUT}$. In this example, the current supplied as part of the DC output signal $DC_{OUT}$ is a constant DC current. The current from the first energy transfer leg 12 is equal to zero during the first active state 32 and is equal to the first inductive current $I_1$ during the first inactive state 34. The current from the second energy transfer leg 14 is equal to zero during the second active state 36 and is equal to the second inductive current $I_2$ during the second inactive state 38. The capacitive current $I_C$ has a ripple frequency that is two times the common switching frequency. The ripple frequency translates into a ripple period 40, which is one-half the common switching period 30.

FIGS. 5A, 5B and 5C are graphs showing example timing diagrams of the split-phase switching power converter 10 illustrated in FIG. 3. FIG. 5A shows the first switching signal $SS_1$ and the second switching signal $SS_2$, which is contiguous to the first switching signal $SS_1$. Specifically, the transition from the first active state 32 to the first inactive state 34 and the transition from the second inactive state 38 to the second active state 36 occur approximately simultaneously. Both switching signals $SS_1$, $SS_2$ share a common switching frequency, which translates into a common switching period 30. The first switching signal $SS_1$ has a first active state 32 and a first inactive state 34. The second switching signal $SS_2$ has a second active state 36 and a second inactive state 38. Both switching signals $SS_1$, $SS_2$ have a duty-cycle of approximately 25%. During the first active state 32, the first switching element 22 is closed, which applies the magnitude of the DC input signal $DC_{IN}$ across the first inductive element L1, thereby causing the first inductive current $I_1$ to increase. During the first inactive state 34, the first switching element 22 is open, which causes the first inductive current $I_1$ that was developed during the first active state 32 to be fed into the common energy storage circuit 16. In this example, the magnitude of the DC output signal $DC_{OUT}$ is greater than the magnitude of the DC input signal $DC_{IN}$; therefore, during the first inactive state 34, the voltage across the first inductive element L1 is reversed from the voltage during the first active state 32, resulting in a decrease of the first inductive current $I_1$.

Likewise, during the second active state 36, the second switching element 26 is closed, which applies the magnitude of the DC input signal $DC_{IN}$ across the second inductive element L2, thereby causing the second inductive current $I_2$ to increase. During the second inactive state 38, the second switching element 26 is open, which causes the second inductive current $I_2$ that was developed during the second active state 36 to be fed into the common energy storage circuit 16. Since the magnitude of the DC output signal $DC_{OUT}$ is greater than the magnitude of the DC input signal $DC_{IN}$ during the second inactive state 38, the voltage across the second inductive element L2 is reversed from the voltage during the second active state 36, resulting in a decrease of the second inductive current $I_2$.

FIG. 5B illustrates the first and second inductive currents $I_1$, $I_2$ relative to the first and second switching signals $SS_1$, $SS_2$. FIG. 5C illustrates the capacitive current $I_C$, which is known as the ripple current. The capacitive current $I_C$ is equal to the sum of the currents from the energy transfer legs 12, 14 minus the current supplied as part of the DC output signal $DC_{OUT}$. In this example, the current supplied as part of the DC output signal $DC_{OUT}$ is a constant DC current. The current from the first energy transfer leg 12 is equal to zero during the first active state 32 and is equal to the first inductive current $I_1$ during the first inactive state 34. The current from the second energy transfer leg 14 is equal to zero during the second active state 36 and is equal to the second inductive current $I_2$ during the second inactive state 38. The capacitive current $I_C$ has a ripple frequency that is equal to the common switching frequency. The ripple frequency translates into a ripple period 40, which is equal to the common switching period 30.

By comparing FIG. 4C with FIG. 5C, the ripple frequency of the traditional two-phase switching power converter is two times the ripple frequency of the split-phase switching power converter 10 of the present invention with a distinctly different waveform, which causes a different distribution of harmonics. Therefore, noise signals may be reduced in the passband or at the receive center frequency of an RF receiver by at least 3 decibels (dB).

The split-phase switching power converter 10 illustrated in FIG. 1 is a boost converter; however, additional embodiments of the present invention may include a buck converter or a combination of a boost converter and a buck converter. In addition, the split-phase switching power converter 10 illustrated in FIG. 1 is a two-phase switching power converter having two energy transfer legs; however, other embodiments of the present invention may include a multi-phase split-phase switching power converter having three or more energy transfer legs in which some or all of the active states are contiguous. Additional embodiments of the present invention may have two or more energy transfer legs in which some or all of the inactive states are contiguous. The nominal phase-shift for a multi-phase switching power converter is equal to approximately 360 degrees divided by the number of energy transfer legs in the power converter; therefore, the phase-shift between the energy transfer legs in a two-phase power converter is 180 degrees, the phase-shift between the energy transfer legs in a three-phase power converter is 120 degrees, the phase-shift between the energy transfer legs in a four-phase power converter is 90 degrees, and so on. Those skilled in the art will understand the concepts of the invention and will recognize applications of these concepts not particularly addressed herein. In the present invention, the phase-shift between any of the energy transfer legs may be any value other than the nominal value.

Other embodiments of the present invention may transfer energy differently. In a first embodiment of the present invention, during an active state energy may be transferred from a DC input signal to an energy transfer leg, and energy may be transferred from the energy transfer leg to a common energy storage circuit. During an inactive state, energy transfer from the DC input signal to the energy transfer leg may be prevented, and energy transfer from the energy transfer leg to the common energy storage circuit may be prevented. In a second embodiment of the present invention, during the active state energy may be transferred from the DC input signal to an energy transfer leg, and energy transfer from the energy transfer leg to the common energy storage circuit may be prevented. During the inactive state, energy transfer from the DC input signal to the energy transfer leg may be prevented, and energy may be transferred from the energy transfer leg to the common energy storage circuit.

In a third embodiment of the present invention, during the active state energy transfer from the DC input signal to an energy transfer leg may be prevented, and energy may be transferred from the energy transfer leg to the common energy storage circuit. During the inactive state, energy may be transferred from the DC input signal to the energy transfer leg, and energy transfer from the energy transfer leg to the common energy storage circuit may be prevented. In a fourth embodiment of the present invention, during the active state, energy transfer from the DC input signal to an energy transfer leg may be prevented, and energy transfer from the energy transfer leg to the common energy storage circuit may be prevented. During the inactive state, energy may be transferred from the DC input signal to the energy transfer leg, and energy may be transferred from the energy transfer leg to the common energy storage circuit.

Figure 6:
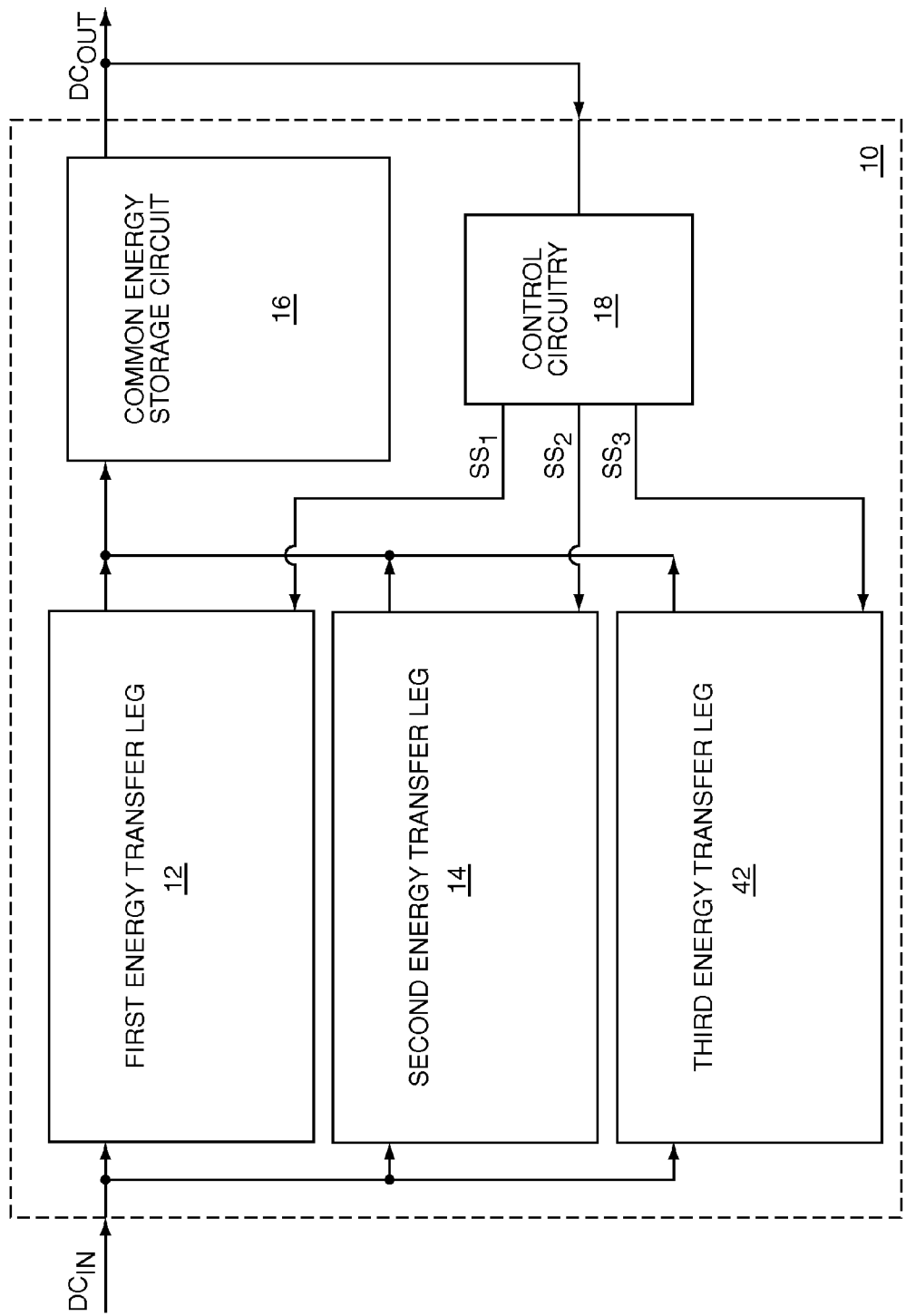
FIG. 6 shows an alternate embodiment of the present invention, which is a split-phase switching power converter having three energy transfer legs.

FIG. 6 shows an alternate embodiment of the present invention, which is a split-phase switching power converter 10 having three energy transfer legs. A third energy transfer leg 42 is added to the split-phase switching power converter 10 illustrated in FIG. 1. The third energy transfer leg 42 receives the DC input signal $DC_{IN}$ and feeds the common energy storage circuit 16. The control circuitry 18 provides a third switching signal $SS_3$ to the third energy transfer leg 42, and regulates the DC output signal $DC_{OUT}$ by varying the switching signals $SS_1$, $SS_2$, $SS_3$.

Figure 7:
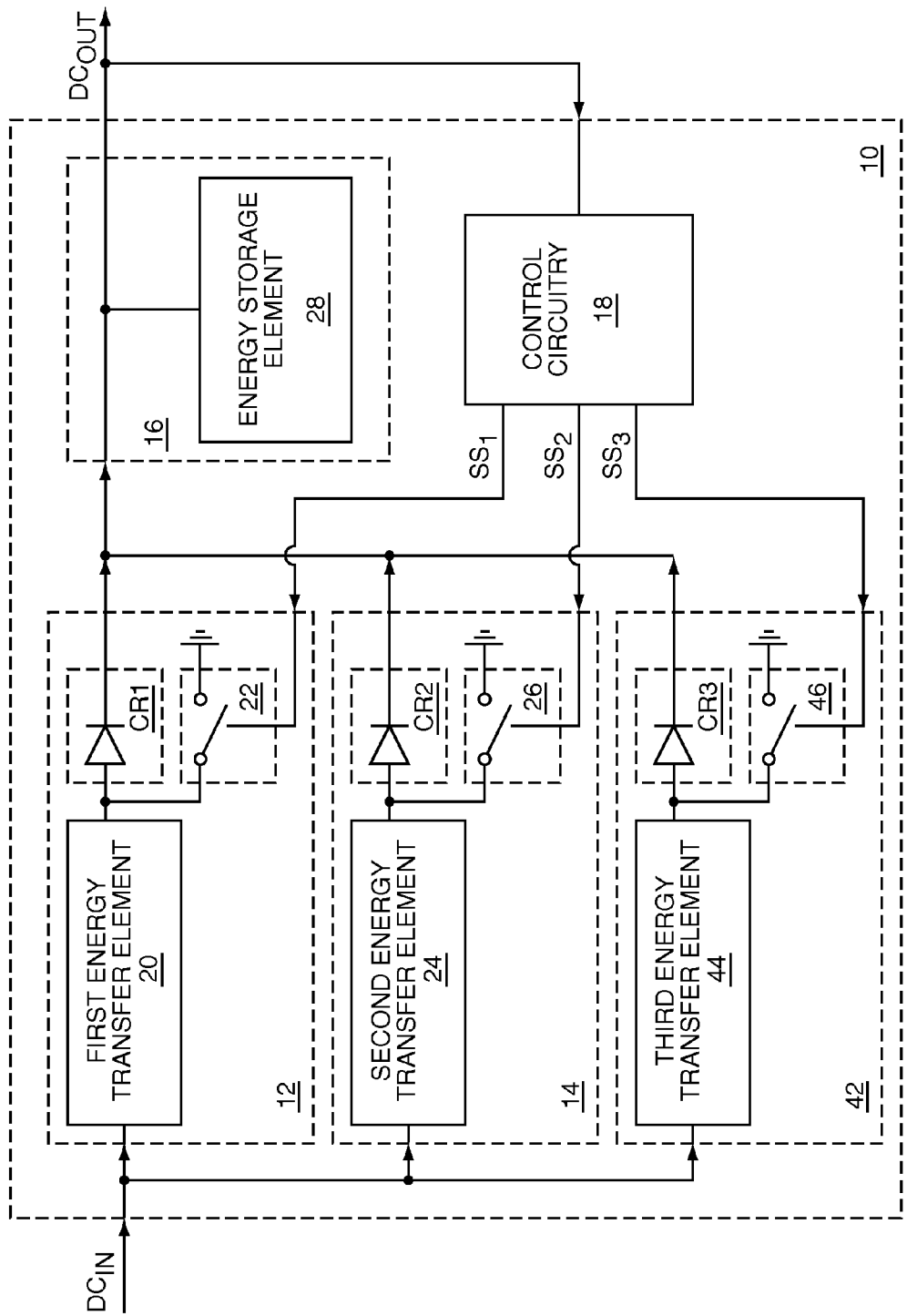
FIG. 7 shows details of the split-phase switching power converter illustrated in FIG. 6.

FIG. 7 shows details of the split-phase switching power converter 10 illustrated in FIG. 6. The third energy transfer leg 42 includes a third energy transfer element 44, which receives the DC input signal $DC_{IN}$ and feeds both the anode of a third diode element CR3 and a third switching element 46. The cathode of the third diode element CR3 feeds the common energy storage circuit 16 and is coupled to the first and second energy transfer legs 12, 14. A control input to the third switching element 46 receives the third switching signal $SS_3$. When the third switching signal $SS_3$ is in a third active state, the third switching element 46 is closed, thereby coupling the output of the third energy transfer element 44 and the anode of the third diode element CR3 to ground. During the third active state, energy may be transferred from the DC input signal $DC_{IN}$ into the third energy transfer element 44. Additionally, the third diode element CR3 isolates the third energy transfer leg 42 from the first and second energy transfer legs 12, 14 and the common energy storage circuit 16. When the third switching signal $SS_3$ is in a third inactive state, the third switching element 46 is open, thereby allowing the voltage at the anode of the third diode element CR3 to rise above the voltage at the cathode of the third diode element CR3, which may forward bias the third diode element CR3. During the third inactive state, energy may be transferred from the DC input signal $DC_{IN}$ and the third energy transfer element 44 into the common energy storage circuit 16.

Figure 8:
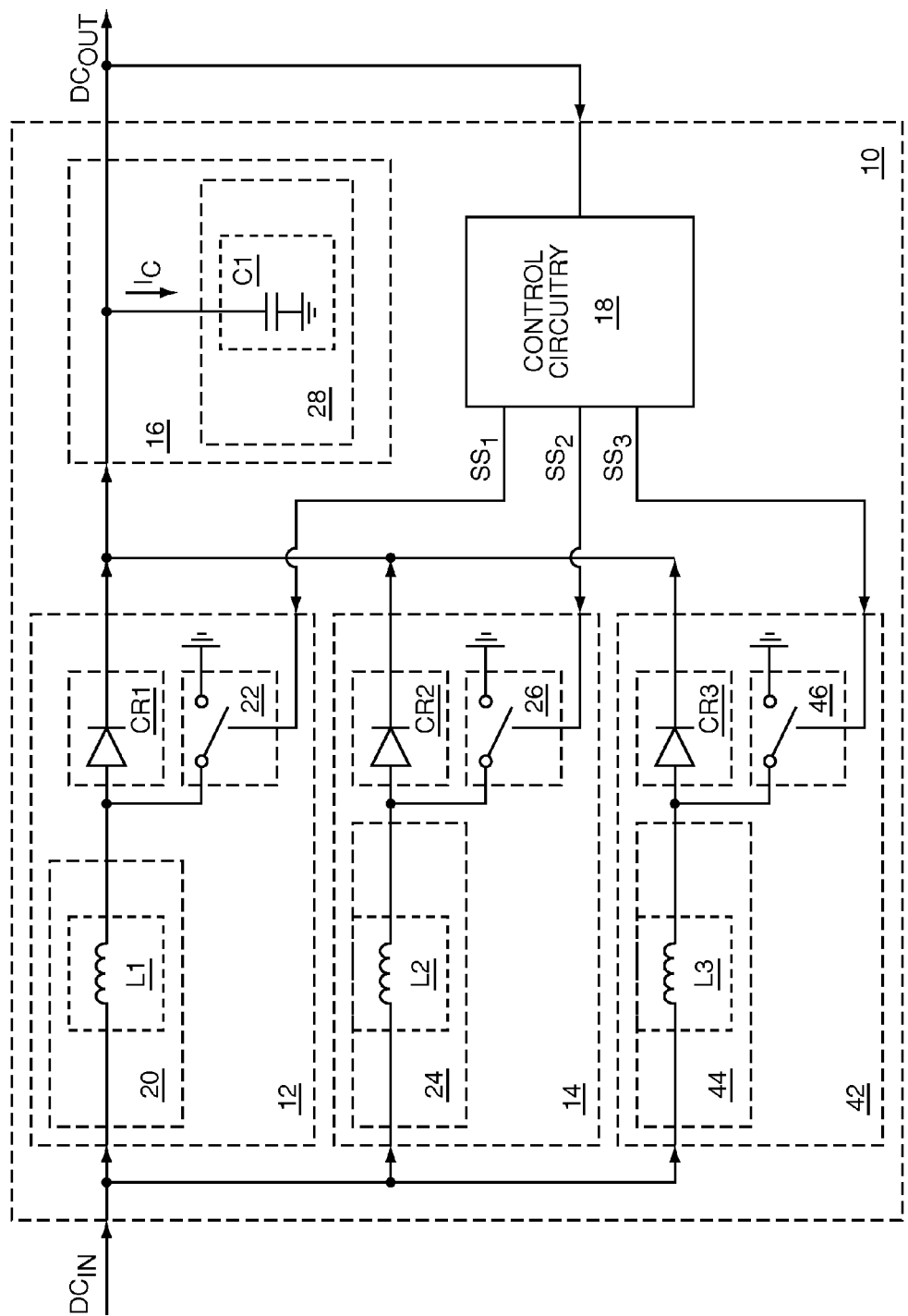
FIG. 8 shows details of the energy transfer and storage elements illustrated in FIG. 7.

FIG. 8 shows details of the energy transfer and storage elements illustrated in FIG. 7. The third energy transfer element 44 may include a third inductive element L3.

Figure 9:
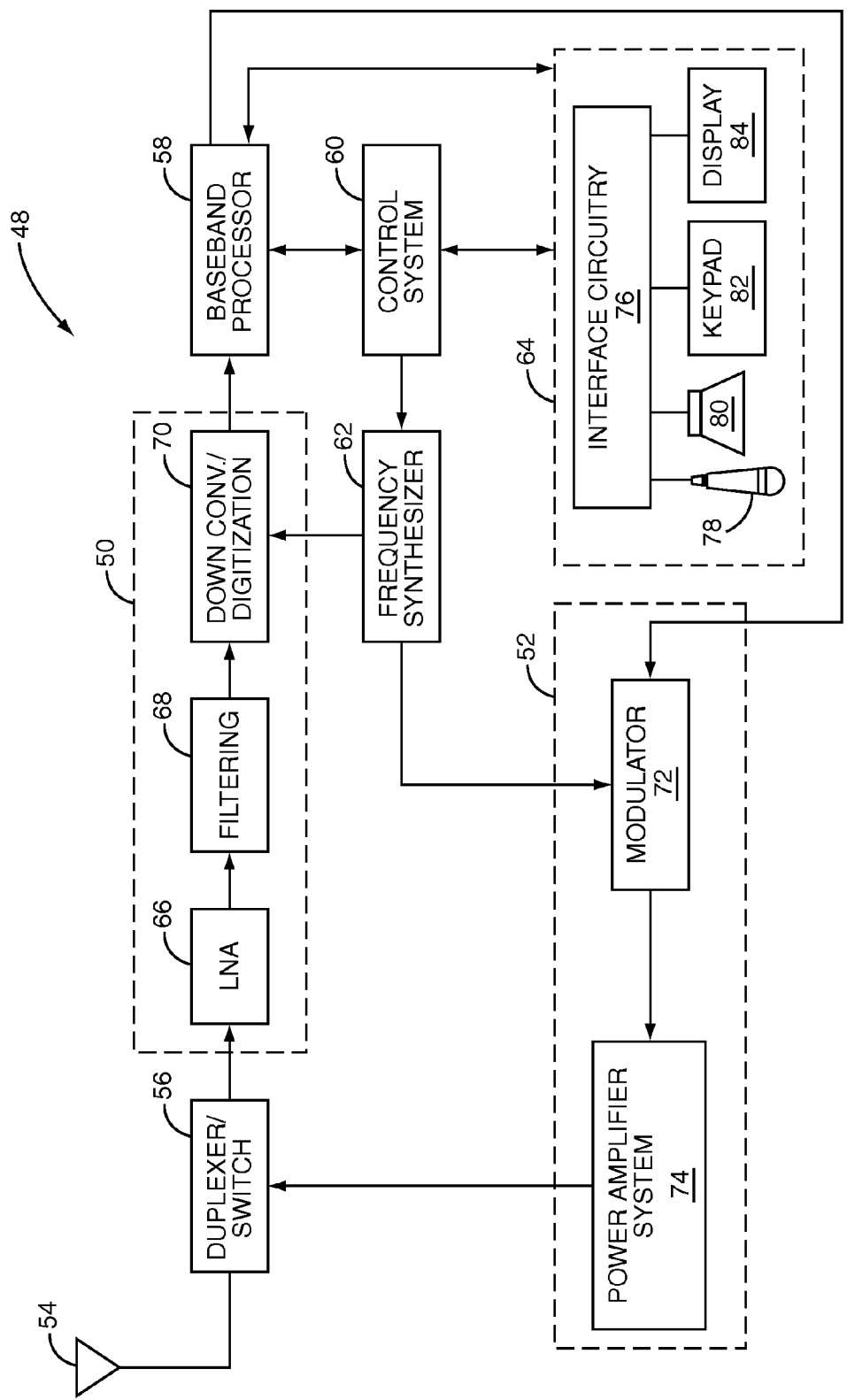
FIG. 9 shows an application example of the present invention used in a mobile terminal.

An application example of a split-phase switching power converter 10 is its use in a power supply system that provides power to a mobile terminal. The basic architecture of a mobile terminal 48 is represented in FIG. 9 and may include a receiver front end 50, a radio frequency transmitter section 52, an antenna 54, a duplexer or switch 56, a baseband processor 58, a control system 60, a frequency synthesizer 62, and an interface 64. The receiver front end 50 receives information bearing radio frequency signals from one or more remote transmitters provided by a base station. A low noise amplifier (LNA) 66 amplifies the signal. A filter circuit 68 minimizes broadband interference in the received signal, while down conversion and digitization circuitry 70 down converts the filtered, received signal to an intermediate or baseband frequency signal, which is then digitized into one or more digital streams. By using a split-phase switching power converter 10, noise signals in the receive passband may be reduced. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by a modulator 72 to modulate a carrier signal that is at a desired transmit frequency. Power amplifier circuitry 74 amplifies the modulated carrier signal to a level appropriate for transmission, and delivers the amplified and modulated carrier signal to the antenna 54 through the duplexer or switch 56.

A user may interact with the mobile terminal 48 via the interface 64, which may include interface circuitry 76 associated with a microphone 78, a speaker 80, a keypad 82, and a display 84. The interface circuitry 76 typically includes analog-to-digital converters, digital-to-analog converters, amplifiers, and the like. Additionally, it may include a voice encoder/decoder, in which case it may communicate directly with the baseband processor 58. The microphone 78 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 76 into an analog signal suitable for driving the speaker 80. The keypad 82 and display 84 enable the user to interact with the mobile terminal 48, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A switching power converter comprising:
   a common energy storage circuit comprising an energy input and adapted to provide a direct current (DC) output signal;
   N energy transfer legs adapted to receive N switching signals having a common switching frequency, wherein each energy transfer leg is coupled to the energy input and adapted to:
      receive a DC input signal; and
      receive one of the N switching signals, and transfer energy from the DC input signal to the energy input based on the one of the N switching signals; and
   control circuitry adapted to:
      receive the DC output signal; and
      provide the N switching signals, wherein during a first period, each of the N switching signals has an active state and during a second period, which is adjacent to the first period, none of the N switching signals has an active state, such that the active state on each of the N switching signals is approximately contiguous to the active state on at least one other of the N switching signals,
   wherein the control circuitry regulates the DC output signal by controlling the N switching signals based on the DC output signal and an output setpoint.

2. The switching power converter of claim 1 wherein the common energy storage circuit is associated with a ripple period, which is about equal to a common switching period.

3. The switching power converter of claim 1 wherein each of the N switching signals comprises:
   a plurality of switching cycles such that each switching cycle comprises the active state and an inactive state; and
   a switching duty cycle that is approximately equal to a duration of the active state divided by a duration of each switching cycle.

4. The switching power converter of claim 3 wherein during the active state, energy is allowed to be transferred from the DC input signal to one of the N energy transfer legs, and energy is allowed to be transferred from the one of the N energy transfer legs to the common energy storage circuit; and during the inactive state, energy transfer from the DC input signal to the one of the N energy transfer legs is prevented, and energy transfer from the one of the N energy transfer legs to the common energy storage circuit is prevented.

5. The switching power converter of claim 3 wherein during the active state, energy is allowed to be transferred from the DC input signal to one of the N energy transfer legs, and energy transfer from the one of the N energy transfer legs to the common energy storage circuit is prevented; and during the inactive state, energy transfer from the DC input signal to the one of the N energy transfer legs is prevented, and energy is allowed to be transferred from the one of the N energy transfer legs to the common energy storage circuit.

6. The switching power converter of claim 3 wherein during the active state, energy transfer from the DC input signal to one of the N energy transfer legs is prevented, and energy is allowed to be transferred from the one of the N energy transfer legs to the common energy storage circuit; and during the inactive state, energy is allowed to be transferred from the DC input signal to the one of the N energy transfer legs, and energy transfer from the one of the N energy transfer legs to the common energy storage circuit is prevented.

7. The switching power converter of claim 3 wherein during the active state, energy transfer from the DC input signal to one of the N energy transfer legs is prevented, and energy transfer from the one of the N energy transfer legs to the common energy storage circuit is prevented; and during the inactive state, energy is allowed to be transferred from the DC input signal to the one of the N energy transfer legs, and energy is allowed to be transferred from the one of the N energy transfer legs to the common energy storage circuit.

8. The switching power converter of claim 1 wherein each switching signal has an inactive state during a common switching period adjacent to the active state.

9. The switching power converter of claim 1 wherein the N energy transfer legs comprise:
   a first energy transfer leg adapted to receive a first switching signal; and
   a second energy transfer leg adapted to receive a second switching signal.

10. The switching power converter of claim 9 wherein N is equal to two.

11. The switching power converter of claim 9 wherein:
   the first switching signal comprises:
      a first plurality of switching cycles such that each switching cycle comprises a first active state and a first inactive state; and
      a first switching duty cycle that is approximately equal to a duration of the first active state divided by a duration of each switching cycle; and
   the second switching signal comprises:
      a second plurality of switching cycles such that each switching cycle comprises a second active state and a second inactive state; and
      a second switching duty cycle that is approximately equal to a duration of the second active state divided by a duration of each switching cycle.

12. The switching power converter of claim 11 wherein the first active state is approximately contiguous to the second active state.

13. The switching power converter of claim 1 wherein the common energy storage circuit comprises at least one energy storage element.

14. The switching power converter of claim 13 wherein the at least one energy storage element comprises at least one capacitive element.

15. The switching power converter of claim 1 wherein each energy transfer leg comprises at least one energy transfer element.

16. The switching power converter of claim 15 wherein the at least one energy transfer element comprises at least one inductive element.

17. The switching power converter of claim 15 wherein each energy transfer leg further comprises at least one switching element.

18. The switching power converter of claim 17 wherein for each energy transfer leg, one of the N switching signals controls the at least one switching element.

19. The switching power converter of claim 17 wherein the at least one switching element is coupled to the energy input and the at least one energy transfer element.

20. The switching power converter of claim 1 wherein the switching power converter is part of power supply circuitry in a radio frequency (RF) communications system.

21. A switching power converter comprising:
- a common energy storage circuit comprising an energy input and adapted to provide a direct current (DC) output signal;
- N energy transfer legs adapted to receive N switching signals having a common switching frequency, wherein each energy transfer leg is coupled to the energy input and adapted to:
  - receive a DC input signal; and
  - receive one of the N switching signals, and transfer energy from the DC input signal to the energy input based on the one of the N switching signals; and
- control circuitry adapted to:
  - receive the DC output signal; and
  - provide the N switching signals, wherein during a first period, each of the N switching signals has an active state and during a second period, which is adjacent to the first period, none of the N switching signals has an active state, such that the active state on each of the N switching signals is approximately contiguous to the active state on at least one other of the N switching signals,
- wherein the control circuitry regulates the DC output signal by controlling the N switching signals based on the DC output signal and an output setpoint.

22. The switching power converter of claim 21 wherein the common energy storage circuit is associated with a ripple period, which is about equal to a common switching period.

* * * * *